UNITED STATES PATENT OFFICE.

LOUIS M. DENNIS, OF ITHACA, NEW YORK.

METHOD OF SEPARATING BENZENE SULFONIC ACID FROM SULFURIC ACID AND OF CONVERTING THE BENZENE SULFONIC ACID INTO A SALT.

1,212,612.    Specification of Letters Patent.    Patented Jan. 16, 1917.

No Drawing.    Application filed December 18, 1915. Serial No. 67,535.

*To all whom it may concern:*

Be it known that I, LOUIS M. DENNIS, a citizen of the United States of America, residing at Ithaca, Tompkins county, New York, have invented certain new and useful improvements in methods of separating benzene sulfonic acid from sulfuric acid and of converting the benzene sulfonic acid into a salt by treatment with a suitable base or compound, of which the following is a specification.

My invention relates to methods of separating benzene sulfonic acid from sulfuric acid and the converting of the benzene sulfonic acid into a salt of the same by treatment with a suitable base or compound, and has as its object the shortening of time, lessening in labor and saving of material in carrying out said method and the consequent resulting economies in cost production.

I shall illustrate my invention by describing the making of sodium benzene sulfonate although the invention is not restricted to the making of such salt alone.

It has been the general commercial practice in making salts of benzene sulfonic acid, specifically sodium benzene sulfonate, to treat benzene with fuming sulfuric acid to produce benzene sulfonic acid in the presence of an excess of sulfuric acid; this mixture is then usually treated with lime and a sodium compound, which forms chiefly calcium sulfate and sodium benzene sulfonate; these two salts are then separated by treatment with water which dissolves the sodium benzene sulfonate with a little of the calcium sulfate, and the solid is then separated from the solution by filtration. This method of separation of the two salts is, however, not sharp, and to avoid large loss it is usually necessary to repeatedly wash the calcium sulfate with water to remove the sodium benzene sulfonate, filtering off the solution of the sodium salt after each such washing. The separation may of course be completed by repeated washing but this is uneconomical. The dilute solution of sodium benzene sulfonate must then be evaporated to dryness. It will be observed that the excess of sulfuric acid which has not reacted with the benzene is converted into the comparatively valueless calcium sulfate and thus lost.

By my method, I avoid the use of lime and consequent production of calcium sulfate; I avoid the consequent necessary separation by filtration; I avoid the evaporation of dilute solution and recover the excess of sulfuric acid which has not reacted with the benzene.

In carrying out my process I treat the mixture of benzene sulfonic acid and sulfuric acid, formed as above stated, with benzene which dissolves the benzene sulfonic acid but not the sulfuric acid. The solution of benzene sulfonic acid in benzene, which separates from the residual sulfuric acid in a distinct layer is then brought into contact with a suitable base or compound, such as an aqueous solution of sodium hydroxid, whereupon the salt of the benzene sulfonic acid separates out in solid form, being insoluble in the benzene, and is separated from the benzene by any suitable means such as filtration, evaporation, or both. The benzene thus set free is used again in the extraction of further portions of benzene sulfonic acid from a fresh mixture of the same with sulfuric acid. The sulfuric acid which remains after the benzene sulfonic acid has been removed from it by the benzene is drawn off and used for any desired purpose.

Instead of treating the benzene solution of the benzene sulfonic acid directly with a base or compound, such as sodium hydroxid, the solution may be treated with water which will dissolve out the sulfonic acid from the benzene and the resulting water solution then neutralized as above described, the salt being separated out by evaporation of the water.

It is obvious that other solvents than benzene may be used to dissolve the benzene sulfonic acid and that other salts than the sodium salt of said acid may be produced by the use of suitable bases or other compounds.

I claim:

1. A method of separating benzene sulfonic acid from sulfuric acid consisting in treating a mixture of the acids with a solvent which dissolves but one of them.

2. A method of separating benzene sulfonic acid from sulfuric acid consisting in treating a mixture of the acids with a solvent which dissolves the benzene sulfonic acid but not the sulfuric acid.

3. A method of separating benzene sulfonic acid from sulfuric acid consisting in treating a mixture of the acids with an organic solvent which dissolves the benzene sulfonic acid but not the sulfuric acid.

4. A method of separating benzene sulfonic acid from sulfuric acid consisting in treating a mixture of the acids with benzene.

5. A method of making a salt of benzene sulfonic acid consisting in dissolving the benzene sulfonic acid in a solvent in which the salt is not soluble and treating the solution with a suitable compound to form the salt.

6. A method of making a salt of benzene sulfonic acid consisting in dissolving the benzene sulfonic acid in an organic solvent in which the salt is not soluble and treating the solution with a suitable compound to form the salt.

7. A method of making a salt of benzene sulfonic acid consisting in dissolving the benzene sulfonic acid in benzene and treating the solution with a suitable compound to form the salt.

8. A method of making sodium benzene sulfonate consisting in dissolving benzene sulfonic acid in benzene and treating the solution with an aqueous solution of sodium hydroxid.

9. A method of separating benzene sulfonic acid from sulfuric acid and converting the benzene sulfonic acid into a salt of the acid consisting in treating a mixture of the acids with a solvent which dissolves the benzene sulfonic acid only, drawing off the solution and treating the solution with a suitable compound to form a salt insoluble in the original solvent.

10. A method of separating benzene sulfonic acid from sulfuric acid and converting the benzene sulfonic acid into a salt of the acid consisting in treating a mixture of the acids with benzene, drawing off the benzene solution of benzene sulfonic acid and treating the solution with a suitable compound to form a salt insoluble in benzene.

11. A method of separating benzene sulfonic acid from sulfuric acid and converting the benzene sulfonic acid into the sodium salt of the acid consisting in treating a mixture of the acids with benzene, drawing off the benzene solution of benzene sulfonic acid and treating the solution with an aqueous solution of sodium hydroxid.

12. A method of separating benzene sulfonic acid from sulfuric acid and converting the benzene sulfonic acid into a salt of the acid consisting in treating a mixture of the acids with benzene, drawing off the benzene solution of benzene sulfonic acid, treating the solution with a suitable compound to form a salt insoluble in benzene, drawing off the benzene freed from the salt of the benzene sulfonic acid and returning the same to a fresh portion of the mixed acids.

13. A method of separating benzene sulfonic acid from sulfuric acid consisting in treating a mixture of the acids with benzene, drawing off the benzene solution of benzene sulfonic acid, freeing the benzene from the benzene sulfonic acid and returning the benzene to a fresh portion of the mixed acids.

In testimony whereof I have signed this specification.

LOUIS M. DENNIS.